(12) United States Patent
Gardner et al.

(10) Patent No.: US 12,535,376 B2
(45) Date of Patent: Jan. 27, 2026

(54) PRESSURE TRANSDUCER WITH A TEMPERATURE DETECTOR

(71) Applicant: KULITE SEMICONDUCTOR PRODUCTS, INC., Leonia, NJ (US)

(72) Inventors: Robert Gardner, Westwood, NJ (US); Louis DeRosa, Saddle River, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 413 days.

(21) Appl. No.: 18/300,518

(22) Filed: Apr. 14, 2023

(65) Prior Publication Data

US 2024/0344911 A1 Oct. 17, 2024

(51) Int. Cl.
| | | |
|---|---|---|
| *G01L 19/00* | (2006.01) |
| *G01K 1/14* | (2021.01) |
| *G01L 7/08* | (2006.01) |
| *G01L 19/14* | (2006.01) |

(52) U.S. Cl.
CPC .......... *G01L 19/0092* (2013.01); *G01K 1/14* (2013.01); *G01L 7/082* (2013.01); *G01L 19/147* (2013.01)

(58) Field of Classification Search
CPC ... G01L 19/0092; G01L 19/147; G01L 7/082; G01K 1/14
See application file for complete search history.

(56) References Cited

U.S. PATENT DOCUMENTS

| | | | | |
|---|---|---|---|---|
| 5,983,731 A | * | 11/1999 | Sommerfeld | G01L 1/02 73/862 |
| 11,668,617 B2 | * | 6/2023 | Doria | G01L 19/0645 73/706 |
| 2023/0384177 A1 | * | 11/2023 | Matsushita | G01L 9/0001 |

FOREIGN PATENT DOCUMENTS

| | | | | |
|---|---|---|---|---|
| EP | 0620426 A1 | * | 10/1994 | G01L 19/0092 |
| EP | 3279629 A1 | * | 2/2018 | G01L 19/0092 |

OTHER PUBLICATIONS

English abstract of EP-3279629 accessed from worldwide.espacenet.com.*

* cited by examiner

Primary Examiner — Kristina M Deherrera
Assistant Examiner — Jean F Morello
(74) Attorney, Agent, or Firm — TROUTMAN PEPPER LOCKE LLP; James E. Schutz; Mark Lehi Jones (57) ABSTRACT

A pressure and temperature transducer assembly with an improved temperature response and reduced footprint is provided that includes a header having a front surface and a back surface, an oil fill cavity disposed at the front surface of the header, a pressure chip mounted on the header, a temperature probe opening extending from the back surface towards or within the oil fill cavity of the header, and a temperature probe mounted in the temperature probe opening so that at least the front portion of the temperature probe extends into the oil fill cavity or is in close proximity and at least partially surrounded by the oil fill cavity.

12 Claims, 5 Drawing Sheets

PRESSURE TRANSDUCER WITH A TEMPERATURE DETECTOR

TECHNICAL FIELD

The disclosed technology relates to oil-filled pressure transducers, and in particular, to improved systems and methods for utilizing a temperature detector probe that is placed adjacent to or within an oil fill cavity to facilitate heat transfer and to allow measurement of both pressure and temperature in a single housing while reducing the transducer footprint.

BACKGROUND

When both temperature and pressure measurements of a pressure media are needed, it is often advantageous to measure both the temperature and pressure using a single transducer housing. A dual-measurement housing, for example, can be attached to a single opening in the apparatus, and the associated power/signal wires to/from the dual-measurement transducer can be combined in a single wiring harness, which can simplify the measurement setup and wire routing.

Figure 1:
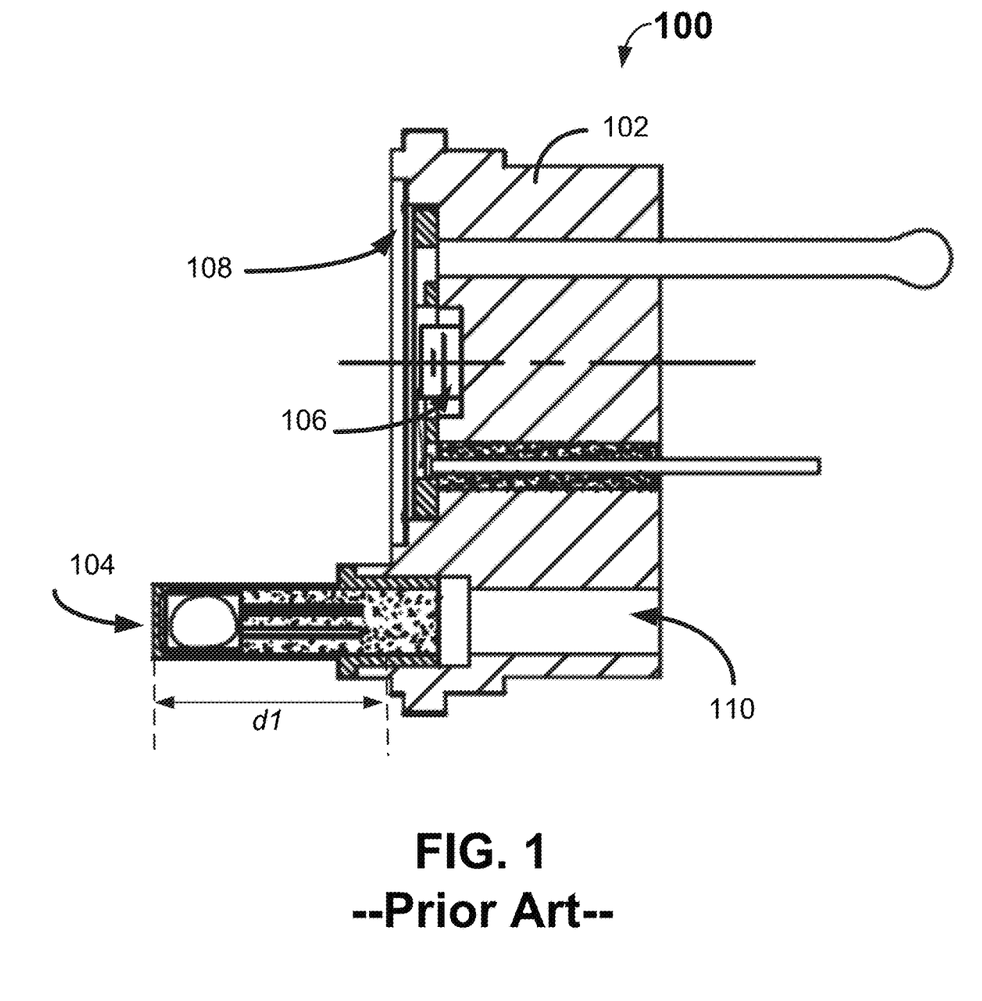
FIG. 1 depicts a conventional temperature and pressure transducer assembly having a large diameter header configured to accommodate the temperature probe, but the temperature probe is not in close proximity with the oil fill cavity.

FIG. 1 depicts a conventional dual-measurement transducer 100 having a large diameter header 102 that is configured to house both a temperature detector 104 and pressure sensing chip 106. The large diameter header 102 is machined to have an oil fill cavity 108 in proximity or intimate contact with the pressure sensing chip 106, as discussed in U.S. Pat. No. 6,591,686. A through hole 110 is machined through the back side of the header 102 in which the temperature probe 104 is inserted and brazed (or otherwise secured) to protrude directly into the pressure media by approximately d1=0.2". While the protruding temperature probe 104 can provide improved temperature measurement response, this header 102 design has the disadvantages of being significantly larger in diameter to accommodate the temperature probe 102, while adding the extra complications of requiring clearance within the pressure media to accommodate the protruding temperature probe 102 and possibly requiring extra sealing precautions around the temperature probe 102.

Figure 2:
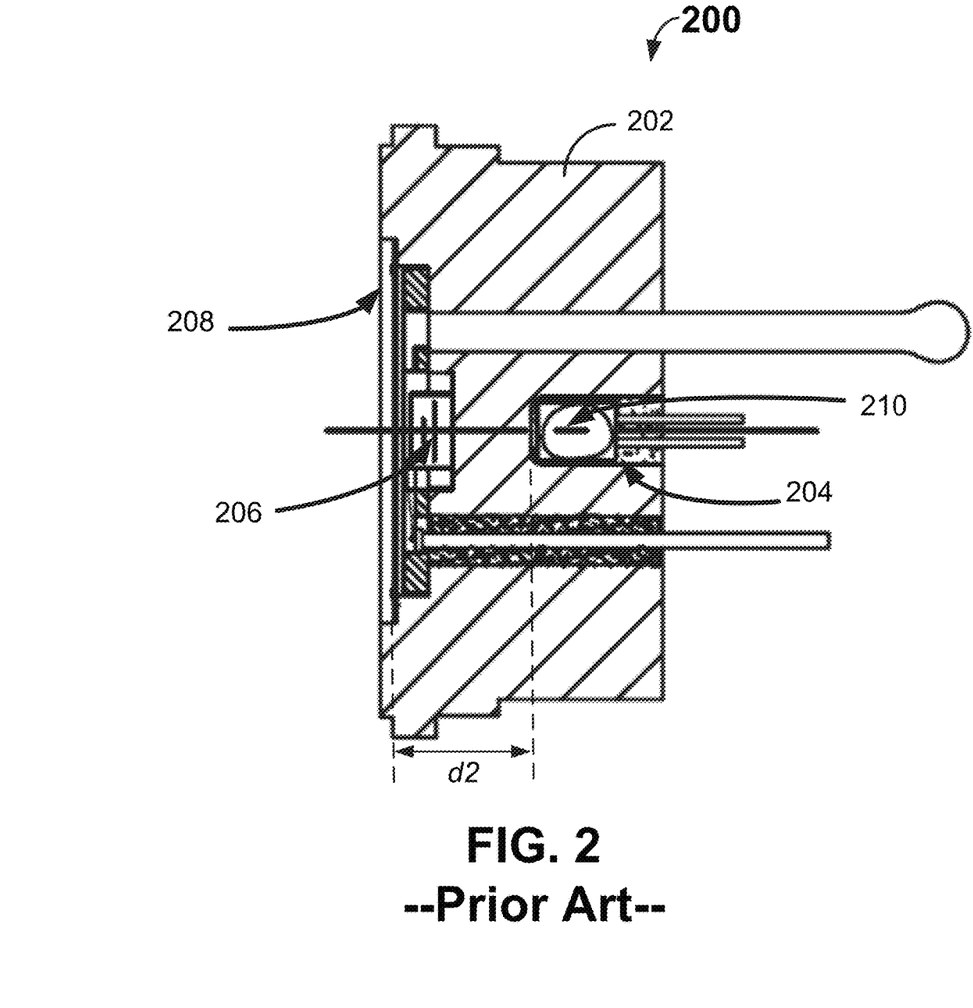
FIG. 2 depicts a reduced footprint conventional temperature and pressure transducer assembly having a temperature probe that is disposed behind the pressure sensing chip, but the temperature probe is not in close proximity to the pressure media or the oil fill cavity

FIG. 2 depicts another conventional dual-measurement transducer 200 having a reduced footprint header 202. In this design, a separate cavity 204 is machined in the back side of the header 202 behind the pressure sensing chip 206 and the oil fill cavity 208. A temperature probe 210 is inserted and brazed into the cavity 204. This transducer 200 design has the advantage of being the same diameter as a pressure-only sensor header, but because the temperature probe 210 is offset away from the oil fill cavity 208 by a distance d2 of over 0.100", and thus is not in close proximity with the pressure media, the temperature probe 210 has a long response time (on the order of 10's to 100's of seconds) and can it also be inaccurate if the body of the transducer 200 is at a different temperature than the media, for example, due to temperature gradients in the transducer 200.

A need exists for an improved transducer header configuration that can measure both temperature and pressure with improved temperature measurement response with a compact footprint.

BRIEF SUMMARY

The disclosed technology provides an improved transducer assembly for measuring pressure and temperature by using a reduced-size header in which a temperature detector probe is disposed in close thermal proximity to or in intimate contact with an oil fill cavity.

In one exemplary implementation of the disclosed technology, a transducer assembly is provided that includes a header having a front surface and a back surface, an oil fill cavity disposed at the front surface of the header, a pressure chip mounted on the header, a temperature probe opening extending from the back surface to within the oil fill cavity of the header, and a temperature probe mounted in the temperature probe opening so that the front portion of the temperature probe protrudes into the oil fill cavity.

In another exemplary implementation, a transducer assembly is provided that includes a header having a front surface and a back surface, an oil fill cavity disposed at the front surface of the header, a pressure chip mounted on the header, a protrusion into the oil fill cavity, a temperature probe cavity extending from an opening in the back surface of the header to under the protrusion within a predetermined distance of the oil fill cavity but not extending into the oil fill cavity, and a temperature probe mounted in the temperature probe cavity such that the temperature probe is configured to measure a temperature of a portion of the header adjacent to the oil fill cavity.

In another exemplary implementation, a method is disclosed for assembling a transducer assembly that includes forming a header with a front surface and a back surface; machining an oil fill cavity at the front surface of the header, machining a temperature probe cavity in the header, the temperature probe cavity including an opening in the back surface of the header and extending into the header towards the front surface of the header in proximity of or extending into the oil fill cavity, mounting a pressure chip on the header, welding an isolation diaphragm onto the oil fill cavity, and mounting a temperature probe in the temperature probe cavity. In certain exemplary implementations, the temperature probe cavity may be machined within a predetermined distance of the oil fill cavity. In certain exemplary implementations, the temperature probe cavity may be machined to allow at least a front portion of the temperature probe to protrude into the oil fill cavity.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

Although many embodiments of the disclosed technology are explained in detail, it is to be understood that other embodiments are contemplated. Accordingly, it is not intended for the disclosed technology to be limited in scope to the details of construction and arrangement of components outlined in the following description or illustrated in the drawings. The disclosed technology is capable of other embodiments and of being practiced or carried out in various ways. Also, in describing the preferred embodiments, specific terminology will be resorted to for the sake of clarity.

According to certain example implementations, a transducer assembly is disclosed for measuring one or more parameters or properties associated with an input condition stream. The term "condition stream" as used herein may refer to a measurement medium, such as a liquid or a gas. The transducer assembly may be configured to measure pressure and/or temperature associated with the condition stream.

Certain implementations of the disclosed technology may utilize a resistance temperature probe, also known as a resistance temperature detector (RTD) to measure the temperature of a pressure medium and/or regions of a transducer header in close proximity to the pressure medium by sensing changes in electrical resistance. RTDs typically consist of a thin wire made of pure metal, such as platinum, that has a known and stable resistance at a given temperature. In certain exemplary implementations, the thin wire is wound into a small coil or placed in a ceramic or glass core, which is then housed in a protective metal sheath. As the temperature of the RTD changes, the electrical resistance of the metal wire also changes predictably. This change in resistance is typically measured by passing a small electrical current through the wire and measuring the resulting voltage drop across it. By using a simple mathematical relationship known as the "temperature coefficient of resistance," the resistance measurement can be converted into a temperature reading. RTDs are highly accurate and reliable temperature sensors, and they are commonly used in a wide range of industrial and scientific applications as they offer superior accuracy and stability over a wide temperature range.

Besides RTDs, several other types of temperature probes may be utilized in conjunction with the disclosed technology to measure temperature. Thermocouples, for example, may be utilized in certain applications of the disclosed technology. Thermocouples utilize two dissimilar metal wires connected at a junction. When there is a temperature difference between the junction and the other end of the wires, a small electrical voltage is generated, which can be measured and converted into a temperature reading. Thermocouples provide certain advantages including high accuracy, fast response times, and durability.

Thermistors, for example, may be utilized in certain applications of the disclosed technology. Thermistors are temperature sensors that use a semiconductor material with a known and predictable resistance-temperature relationship. As the temperature of the thermistor changes, its electrical resistance changes in a predictable way. By measuring the resistance, the temperature can be determined. Each type of temperature probe has its advantages and disadvantages, and the choice of which one to use depends on the specific application requirements.

Throughout this disclosure, several references are made to the terms "proximity" or "in close proximity" or "in close thermal proximity" in relation to the placement of the temperature probe within a transducer assembly relative to the pressure media being measured or relative to an oil fill cavity which experiences essentially the same temperature as the pressure media. Unless otherwise indicated, the terms "in close proximity" and "in close thermal proximity" are intended to mean within less than about 0.05". In certain implementations, these terms "in close proximity" and "in close thermal proximity" can mean within less than about 0.030". In certain implementations, these terms "in close proximity" and "in close thermal proximity" can mean within less than about 0.020". In certain implementations, these terms "in close proximity" and "in close thermal proximity" can mean within less than about 0.015". In certain implementations, these terms "in close proximity" and "in close thermal proximity" can mean within less than about 0.100". In certain implementations, the temperature probe may be disposed closer to the oil fill cavity, with a minimum distance between the temperature probe and the oil fill cavity dictated by the thinness of a protective wall and potting material around the temperature probe. Certain embodiments discussed herein utilize a thin (0.004"-0.010"), thermally conductive diaphragm to seal the transducer's oil cavity on one side, while the other side of the diaphragm comes in direct contact with the pressure media, thereby easily conducting heat to the oil in the oil fill cavity.

Referring now to the figures, certain example implementations of the disclosed technology are described herein. It is to be understood that the figures and descriptions have been simplified to illustrate elements that are relevant for a clear understanding, while eliminating, for purposes of clarity, many other elements found in typical pressure sensor assemblies and methods of making and using the same. Those of ordinary skill in the art will recognize that other elements may be desirable and/or required for implementation. However, because such elements are well-known in the art, and because they do not facilitate a better understanding of the disclosed technology, a discussion of such elements is not provided herein.

Figure 3:
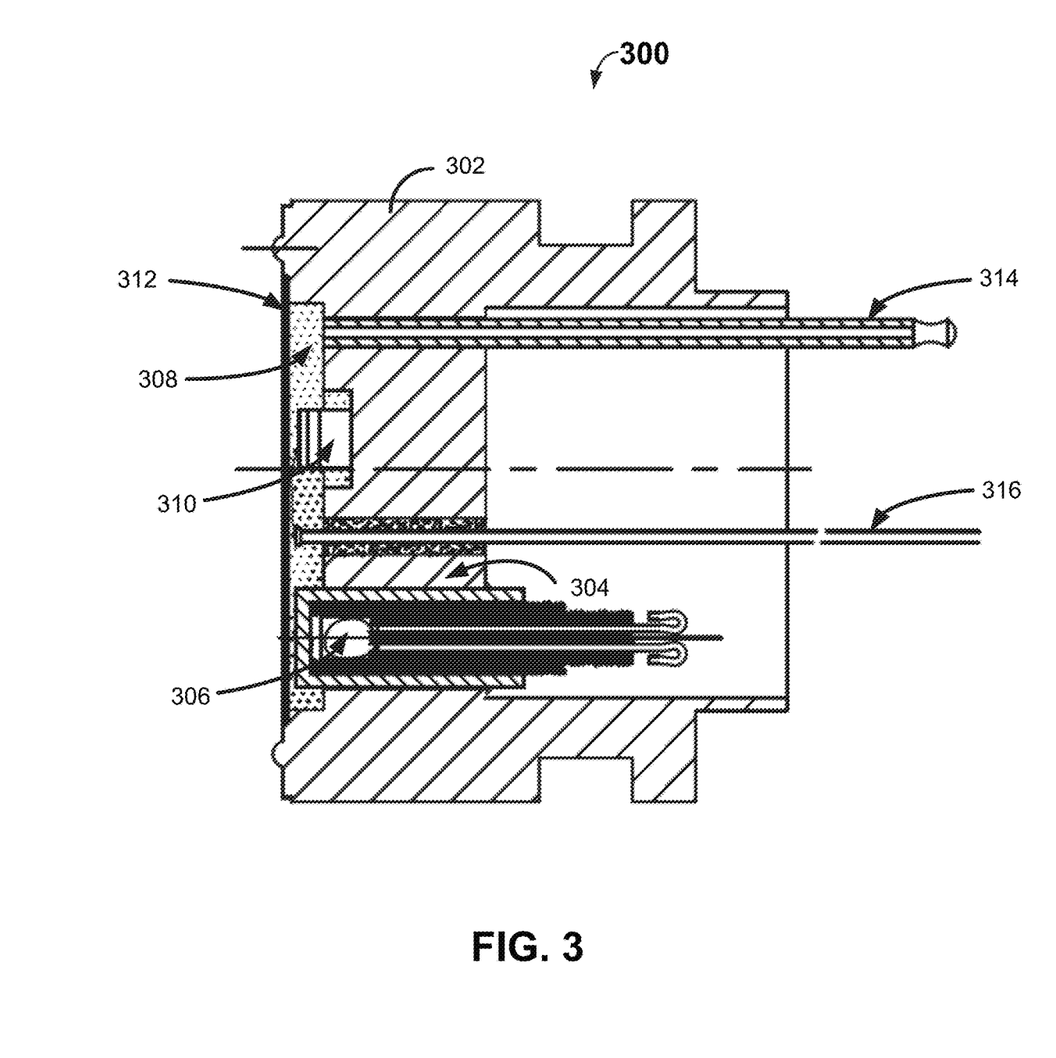
FIG. 3 illustrates a reduced footprint temperature and pressure transducer assembly in which the temperature probe protrudes into the oil fill cavity to provide a better temperature measurement response, according to an example implementation of the disclosed technology.

FIG. 3 illustrates a reduced footprint temperature and pressure transducer assembly 300 having a header 302 configured with an opening 304 (or cavity) in which a temperature probe 306 can be inserted such that its tip can protrude into the oil fill cavity 308 to provide improved temperature measurement response, according to an example implementation of the disclosed technology. In accordance with certain exemplary implementations of the disclosed technology, the temperature probe 306 may be an RTD probe, a thermistor, a thermocouple, etc.

In certain exemplary implementations, the temperature probe 306 may include an outer thin-walled metal tube with either a wire-wound or chip-type RTD potted in place, for example, using a thermally conductive epoxy or room temperature vulcanizing (RTV) silicon. In certain exemplary implementations, the temperature probe 306 may be brazed (or other suitable attachment such as glassing or epoxy) into the opening 304 such that a front portion of the temperature probe 306 protrudes into the oil fill cavity 308, and so that the portion of the opening 304 that creates an aperture in the back side of the oil fill cavity 308 may be sealed by the temperature probe 306 and the brazing (or other attachment method/material) to prevent oil from leaking into or through the opening 304.

In accordance with certain exemplary implementations of the disclosed technology, the tip of the temperature probe 306 may protrude 0.030"-0.100" into the oil fill cavity 308, for example, so that the tip portion of the temperature probe 306 can be in intimate contact with the oil in the oil fill cavity 308 for more accurate and time-responsive temperature measurements. In certain exemplary implementations, the tip of the temperature probe 306 may protrude 0.005"-0.100" into the oil fill cavity 308. In certain exemplary implementations, the temperature probe 306 would not protrude beyond the front surface of the oil fill cavity 308.

In accordance with certain exemplary implementations of the disclosed technology, before the temperature probe 306 is inserted into the opening 304, attached to the header 302, and sealed, a pressure sensing transducer 310 may be mounted to the header 302. In this example embodiment, the pressure-sensing transducer 310 may include a diaphragm that is configured to be in intimate contact with the oil in the oil fill cavity 308. In this respect, both the temperature probe 306 and the pressure-sensing transducer 310 may experience the same temperature. In certain exemplary implementations, the temperature measured by the temperature probe 306 may be utilized to compensate for a temperature-dependent response of the pressure-sensing transducer 310. In certain exemplary implementations, external equipment may be utilized to receive the temperature and/or pressure signals.

In certain exemplary implementations, and as illustrated in FIG. 3, an electrical feed-through port 316 may be utilized for routing conductive wires to/from the pressure-sensing transducer 310. In certain exemplary implementations, the feed-through port 316 may be secured and sealed to the header 302, but electrically isolated from the header 302 using an electrically insulating material such as glassing.

While the feed-through port 316 may be utilized to route certain signal and/or power conductors to/from both the pressure sensing transducer 310 and the temperature probe 306 in certain embodiments, it may be preferable to route only the conductive signal/power wires to/from the pressure sensing transducer 310 through the feed-through port 316. This is because certain types of temperature probes can require 3 or 4 conductors, and if redundant temperature probes are desired, there can be as may be as many as 8 additional openings, which would increase the diameter of the header substantially as compared with a single opening. Accordingly, certain implementations may utilize one or more temperature probes 306 in which the corresponding small gauge wires may be connected to the individual probes and routed out the backside of the assembly 300.

In certain exemplary implementations, an isolation diaphragm 312 may then be welded onto the front portion of the header 302. The isolation diaphragm 312 may transfer external pressure/temperature from the media being measured through the oil fill cavity 308 to the temperature probe 306 and the pressure sensing transducer 310. After the isolation diaphragm 312 is installed, the oil fill tube 314 may be used to fill the oil fill cavity 308. After the oil fill cavity 308 has been filled with oil, the oil fill tube 314 may be crimped or otherwise sealed.

Figure 4:
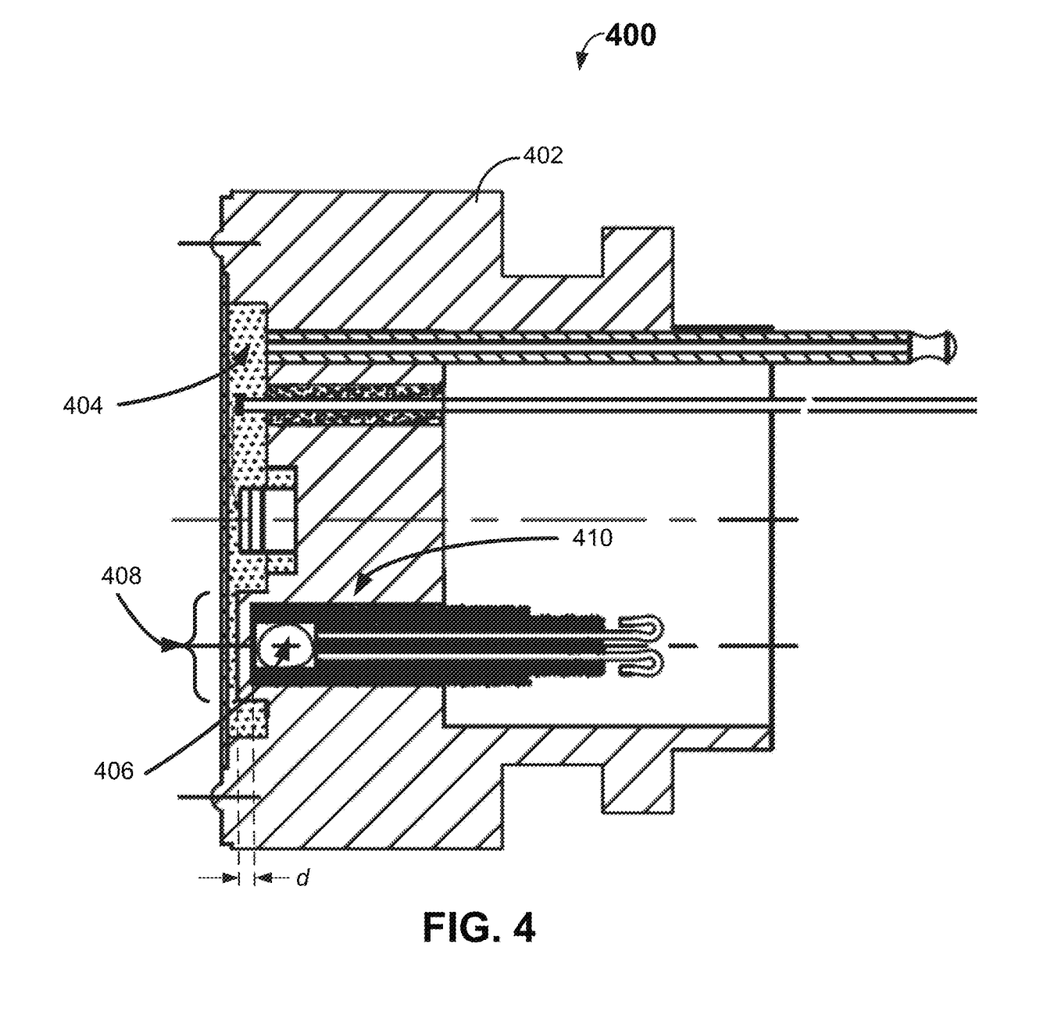
FIG. 4 illustrates another reduced footprint temperature and pressure transducer assembly in which the temperature probe is disposed thermally proximate to the oil fill cavity to provide better temperature measurement response, according to an example implementation of the disclosed technology.

FIG. 4 illustrates another reduced footprint temperature and pressure transducer assembly 400 having a header 402 and an oil fill cavity 404 in which the temperature probe 406 may be mounted within the header 402 so that at least the tip of the temperature probe 406 is partially surrounded by a portion of the oil fill cavity 404 via a raised portion 408 of the oil fill cavity 404 to provide better temperature measurement response, according to an example implementation of the disclosed technology.

In the temperature and pressure transducer assembly 400 example embodiment as illustrated in FIG. 4, instead of having an opening that passes through the back side of the header 402 to the oil fill cavity 404 (such as is the case for the opening 304 as shown in FIG. 3), the assembly 400 may utilize a bore channel 410 that is machined part of the way through the back side of the header 402. In this embodiment, the bore channel 410 may terminate before reaching the oil fill cavity 404. A raised-area 408 within the oil fill channel 404 may allow the temperature probe 406 to be inserted into the bore channel 410 and potted into place, for example, so that the oil fill cavity 404 at least partially surrounds the tip of the temperature probe 406 for enhanced temperature measurement accuracy and response time. In certain exemplary implementations, the bore may be configured so that the tip of the temperature probe 406 can be placed to within about d=0.010"-0.100" of the oil fill cavity 404. In certain exemplary implementations, the bore may be configured so that the tip of the temperature probe 406 can be placed to within about d=0.020"-0.050" of the oil fill cavity 404. In certain exemplary implementations, the bore may be configured so that the tip of the temperature probe 406 can be placed to within about d=0.030"-0.070" of the oil fill cavity 404. In certain exemplary implementations, the bore may be made so that it does not require an extra step of sealing the portion of the oil fill cavity 404 where the temperature probe meets the oil fill cavity, as may be the case in the embodiment discussed above with respect to FIG. 3. In accordance with certain exemplary implementations, the transducer assembly 400 may provide certain advantages such as being tightly controlled in terms of placement depth of the temperature probe 408 while still having a compact footprint and enhanced temperature response.

As discussed herein, certain implementations of the disclosed technology can provide the technical improvement and practical advantage of disposing a temperature probe in very close contact with pressure media to facilitate heat transfer for improved temperature response. It should be clear that the disclosed technology may be used with other types of headers without oil fill, such as in applications that utilize a leadless header as discussed in U.S. Pat. No. 8,013,453, which is incorporated herein by reference as if presented in full.

While FIGS. 3 and 4 illustrate assemblies having a single pressure sensing transducer, it should be understood that the disclosed technology may also be utilized for improving temperature measurements in transducers that measure a differential pressure between a first input condition stream entering a first inlet port and a second input condition stream entering a second inlet port.

Certain implementations disclosed herein may improve part alignment and/or enable automatic alignment of the associated components during assembly.

Figure 5:
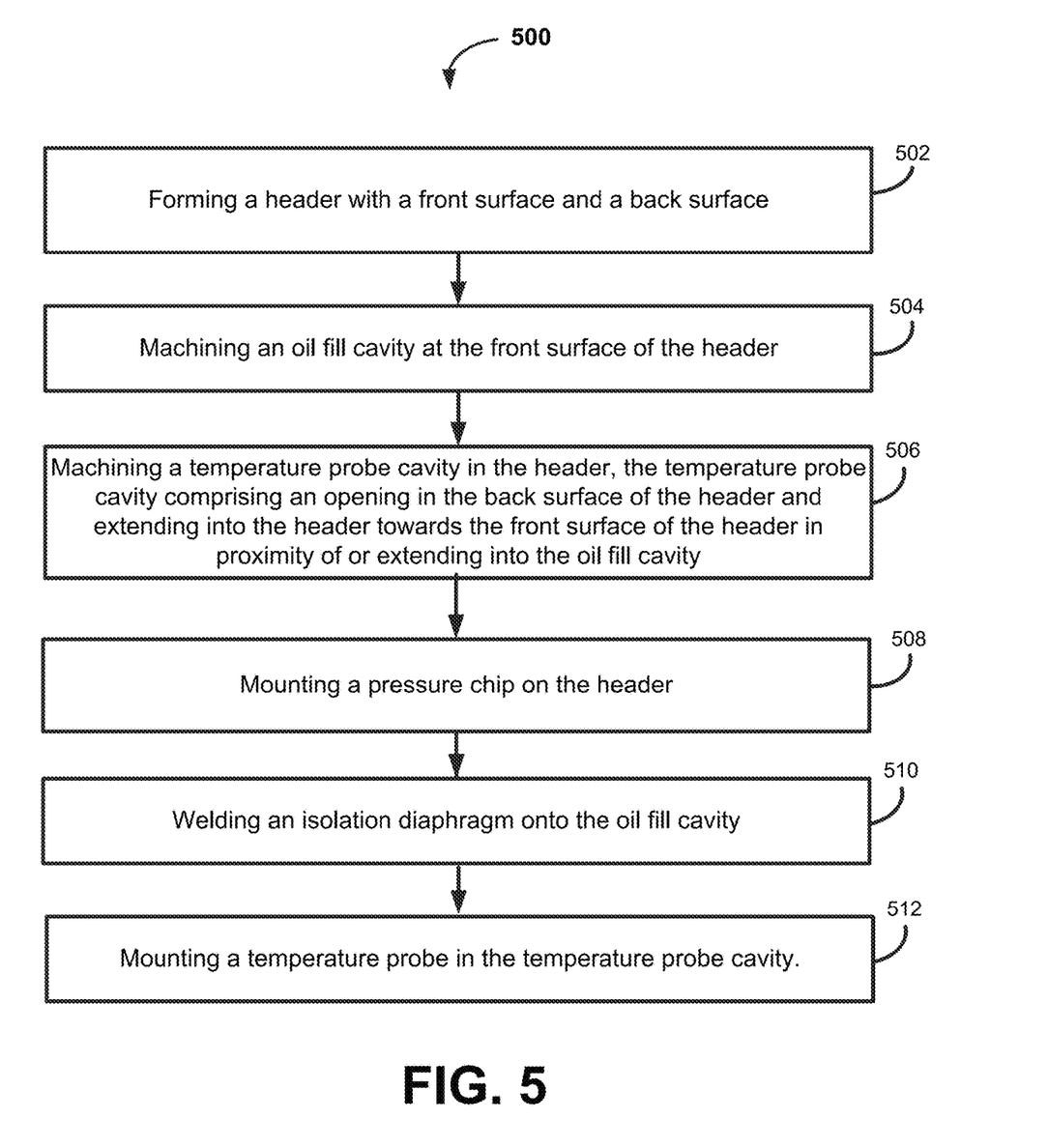
FIG. 5 illustrates a method of assembling a temperature and pressure transducer assembly, in accordance with certain implementations of the disclosed technology.

FIG. 5 is a flow diagram of a method 500 for assembling a temperature and pressure transducer assembly, in accordance with certain implementations of the disclosed technology.

In block 502, the method 500 includes forming a header with a front surface and a back surface. In block 504, the method 500 includes machining an oil fill cavity at the front surface of the header. In block 506, the method 500 includes machining a temperature probe cavity in the header, the temperature probe cavity comprising an opening in the back surface of the header and extending into the header towards the front surface of the header in the proximity of or extending into the oil fill cavity. In block 508, the method 500 includes mounting a pressure chip on the header. In block 510, the method 500 includes welding an isolation diaphragm onto the oil fill cavity. In block 512, the method 500 includes mounting a temperature probe in the temperature probe cavity.

In certain exemplary implementations, the temperature probe cavity may extend to within the oil fill cavity. In certain exemplary implementations, the front portion of the temperature probe may protrude into the oil fill cavity by about 0.030"-0.100". In certain exemplary implementations, the tip of the temperature probe 306 may protrude 0.005"-0.050" into the oil fill cavity 308. In certain exemplary implementations, the tip of the temperature probe 306 may protrude 0.010"-0.050" into the oil fill cavity 308. In certain exemplary implementations, the temperature probe 306 would not protrude beyond the front surface of the oil fill cavity 308.

In accordance with certain exemplary implementations of the disclosed technology, the temperature probe cavity may extend from the opening in the back surface of the header to within a predetermined distance of the oil fill cavity so that at least the front portion of the temperature probe is in close proximity and at least partially surrounded by the oil fill cavity. In certain exemplary implementations, the predetermined distance d may be configured in the range of d=0.010"-0.100" from the oil fill cavity 404. In certain exemplary implementations, the predetermined distance d may be configured in the range of d=0.020"-0.050" from the oil fill cavity 404. In certain exemplary implementations, the predetermined distance d may be configured in the range of d=0.030"-0.070" of the oil fill cavity 404.

As discussed herein, the temperature probe may be configured to measure a temperature of a portion of the header adjacent to the oil fill cavity.

Certain exemplary implementations of the disclosed technology can include welding an isolation diaphragm onto the header and oil filling the header through an oil fill tube in fluid communication with the oil fill cavity.

In certain exemplary implementations, one or more of the oil fill cavity and the temperature probe opening may be machined into to header.

In certain exemplary implementations, certain portions of the temperature probe may be thermally isolated from the header using glassing. In certain exemplary implementations, the temperature probe may be attached to the header using brazing, glassing, or epoxying.

In certain exemplary implementations, electrical feedthroughs may be attached to the leads of the temperature probe.

Certain exemplary implementations of the disclosed technology can include mounting an isolation diaphragm to the front surface of the header for communication with the oil fill cavity.

In certain exemplary implementations, the temperature probe may be thermally isolated from the header using glassing, for example.

As used in the specification and the appended claims, the singular forms "a," "an," and "the" include plural referents unless the context clearly dictates otherwise. Also, in describing the preferred embodiments, certain terminology has been utilized for the sake of clarity. It is intended that each term contemplates its broadest meaning as understood by those skilled in the art and includes all technical equivalents which operate in a similar manner to accomplish a similar purpose.

Ranges have been expressed herein as from "about" or "approximately" one particular value and/or to "about" or "approximately" another particular value. When such a range is expressed, an implementation includes values from one particular value (starting point) and/or to the other particular value (ending point). In certain embodiments, the term "about" signifies a buffer of +/−5% of the said range about each said starting point and/or ending point.

As used herein, the terms "comprising" "containing" or "including" mean that at least the named element or method step is present in the composition or article, or method, but does not exclude the presence of other compounds, materials, particles, method steps, even if the other such compounds, material, particles, method steps have the same function as what is named.

Numerous characteristics and advantages have been outlined in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as outlined in the following claims. Therefore, other modifications or embodiments as may be suggested by the teachings herein are particularly reserved as they fall within the breadth and scope of the claims here appended.

We claim:

1. A transducer assembly for measuring pressure and temperature, the transducer assembly comprising:
    a header having a front surface and a back surface;
    an oil fill cavity disposed at the front surface of the header;
    a pressure chip mounted on the header;
    a protrusion into the oil fill cavity;
    a temperature probe cavity extending from an opening in the back surface of the header to under the protrusion by a predetermined distance of the oil fill cavity but not extending into the oil fill cavity; and
    a temperature probe mounted in the temperature probe cavity, wherein the temperature probe is configured to measure a temperature of a portion of the header adjacent to the oil fill cavity.

2. The transducer assembly of claim 1, further comprising an isolation diaphragm mounted to the front surface of the header and in communication with the oil fill cavity.

3. The transducer assembly of claim 1, wherein the temperature probe is sealed in the temperature probe cavity with thermally conductive potting material.

4. The transducer assembly of claim 1, wherein the temperature probe is a resistance temperature detector (RTD) probe.

5. The transducer assembly of claim 1, wherein the temperature probe is mounted by one or more of brazing, glassing, and epoxying.

6. The transducer assembly of claim 1, wherein the predetermined distance is 0.010"-0.100".

7. The transducer assembly of claim 1, wherein the temperature probe is electrically isolated from the header.

8. The transducer assembly of claim 1, further comprising an oil fill tube in fluid communication with the oil fill cavity.

9. A method of assembling a transducer assembly for measuring pressure and temperature, the method comprising:

forming a header with a front surface and a back surface;
machining an oil fill cavity at the front surface of the header;
machining a temperature probe cavity in the header, the temperature probe cavity comprising an opening in the back surface of the header and extending into the header towards the front surface of the header in proximity of but not extending into-the oil fill cavity;
mounting a pressure chip on the header;
welding an isolation diaphragm onto oil filled cavity; and
mounting a temperature probe in the temperature probe cavity.

10. The method of claim 9, wherein the temperature probe cavity extends from the opening in the back surface of the header to within a predetermined distance of the oil fill cavity but does not extend into the oil fill cavity.

11. The method of claim 10, wherein the temperature probe is configured to measure a temperature of a portion of the header adjacent to the oil fill cavity.

12. The method of claim 9, further comprising welding an isolation diaphragm onto the header and oil filling the header through an oil fill tube in fluid communication with the oil fill cavity.

* * * * *